Sept. 7, 1943.　　　　W. E. INGERSON　　　　2,328,982
APPARATUS FOR MAKING SOLDER CONNECTIONS
Original Filed May 8, 1941　　4 Sheets-Sheet 1
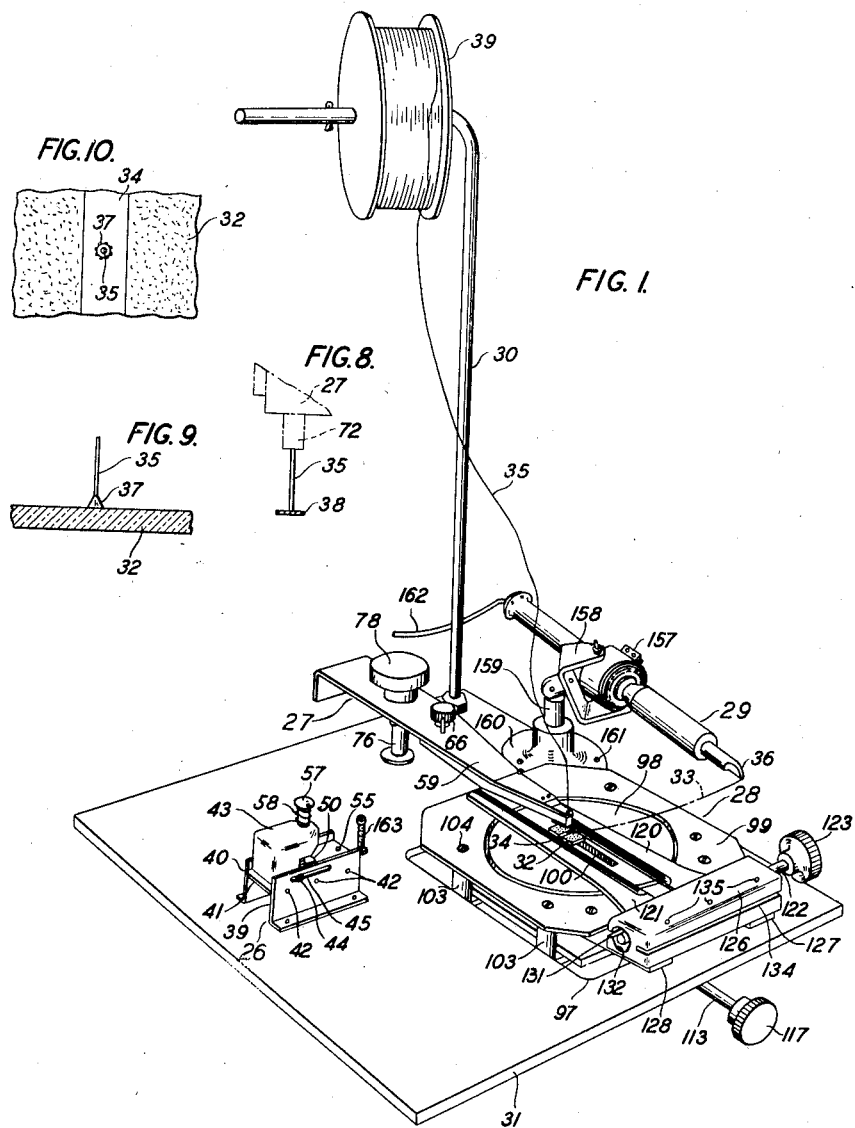
INVENTOR
W. E. INGERSON
BY J. MacDonald
ATTORNEY Sept. 7, 1943.  W. E. INGERSON  2,328,982
APPARATUS FOR MAKING SOLDER CONNECTIONS
Original Filed May 8, 1941   4 Sheets-Sheet 2
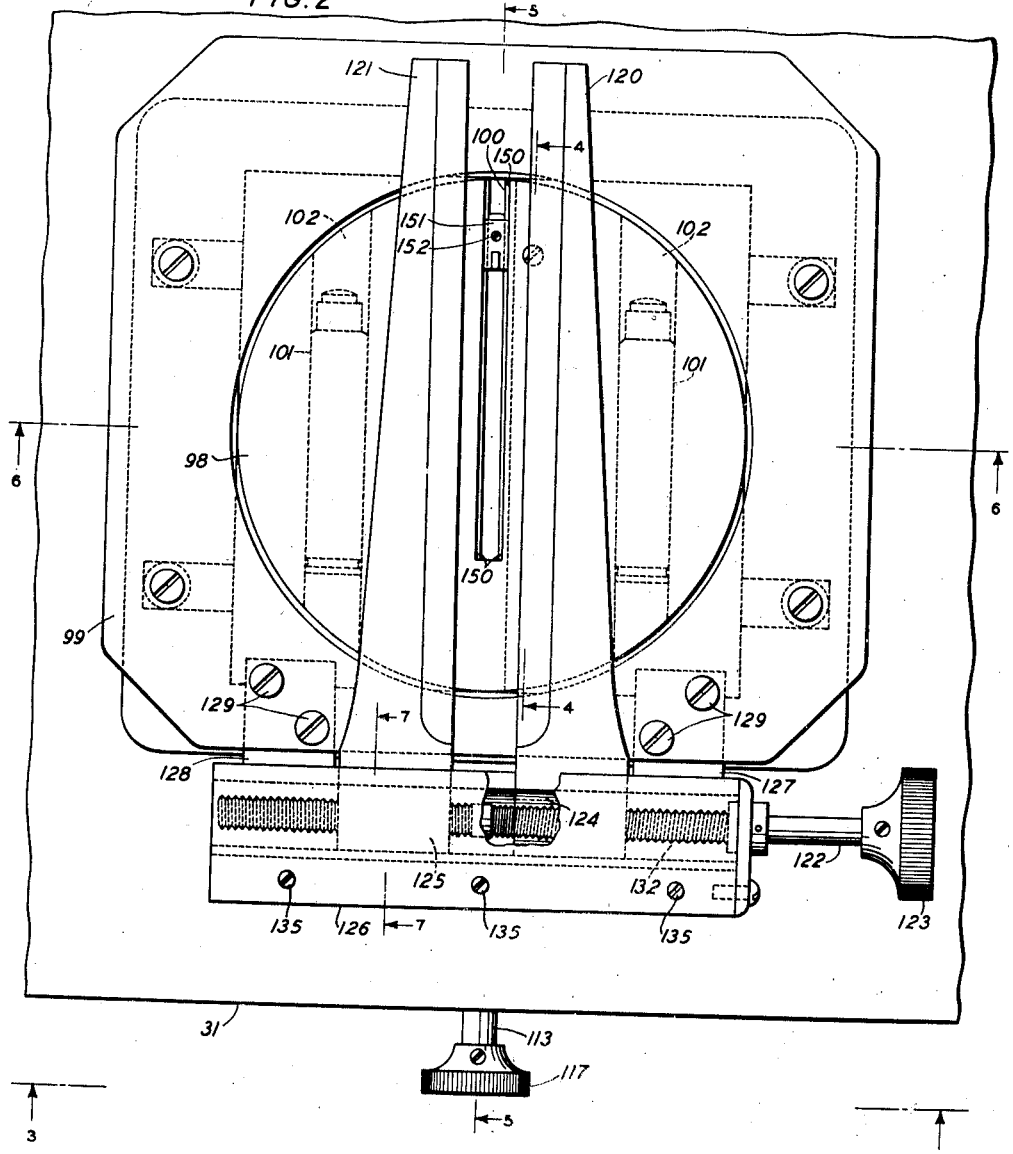
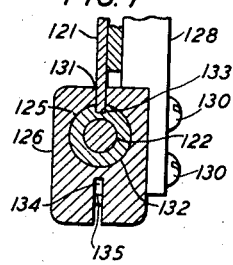
INVENTOR
W.E. INGERSON
BY J. MacDonald
ATTORNEY Sept. 7, 1943.    W. E. INGERSON    2,328,982
APPARATUS FOR MAKING SOLDER CONNECTIONS
Original Filed May 8, 1941    4 Sheets-Sheet 3

INVENTOR
W.E.INGERSON
BY J. MacDonald
ATTORNEY

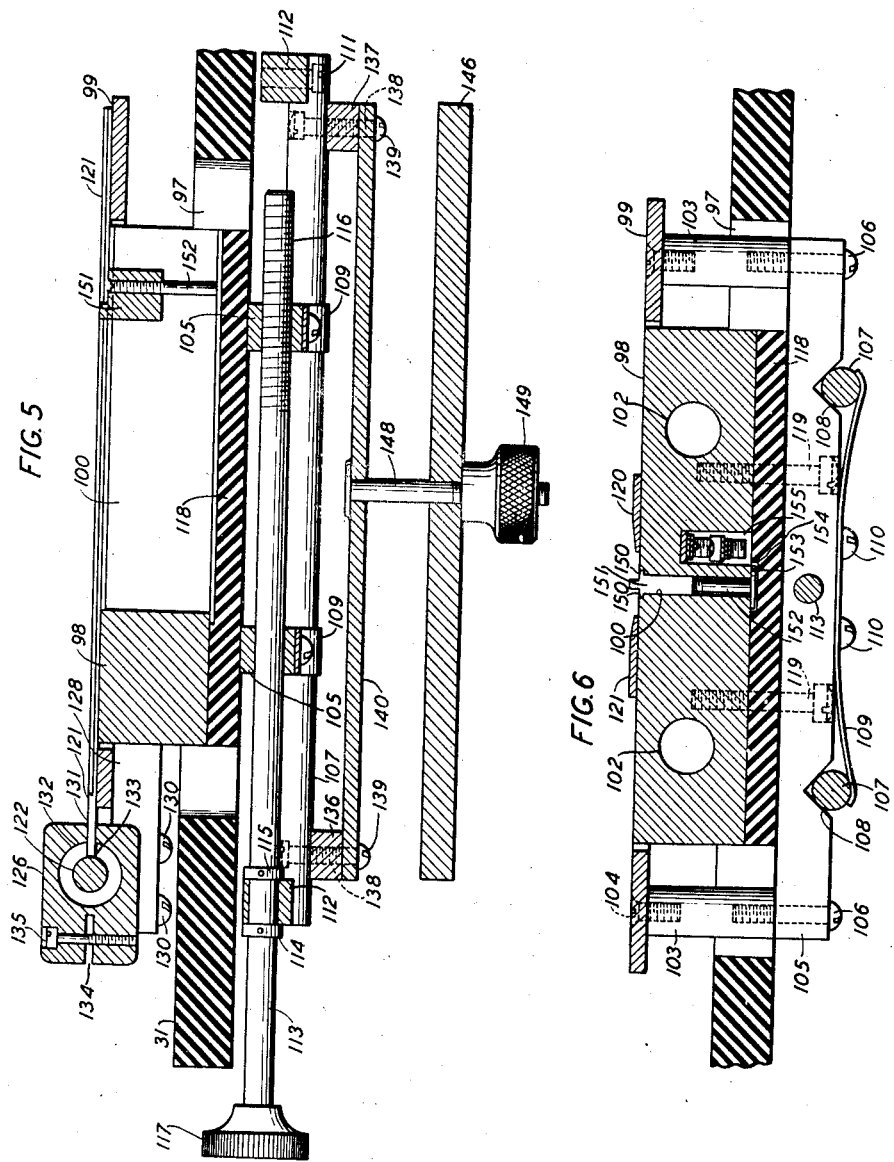

Patented Sept. 7, 1943

2,328,982

UNITED STATES PATENT OFFICE 2,328,982

APPARATUS FOR MAKING SOLDER CONNECTIONS

William E. Ingerson, North Plainfield, N. J., assignor to Bell Telephone Laboratories, Incorporated, New York, N. Y., a corporation of New York Original application May 8, 1941, Serial No. 392,505, now Patent No. 2,308,606, dated January 19, 1943. Divided and this application March 13, 1942, Serial No. 434,521

1 Claim. (Cl. 219—17)

This invention relates to apparatus for making solder connections and may be used in carrying out a method of securing wires of relatively fine gauge to metal surfaces formed on piezoelectric crystals described in my copending application W. E. Ingerson, Serial No. 392,505, filed May 8, 1941 (Patent No. 2,308,606, dated Jan. 19, 1943), and of which the present application is a division.

In practicing the method above mentioned a disc of solder of predetermined size and form is made. The disc is picked up on the end of the wire and is placed at a required point on a metal surface formed on a piezoelectric crystal. The piezoelectric crystal is supported on a hot plate device and is maintained at a required temperature. A heated tool is placed in contact with the disc of solder to make the disc form a solder connection between the wire and the metal surface on the crystal.

The present application covers the hot plate device used in making the solder connection.

In the drawings:

Fig. 1 is a view in perspective of the apparatus employed in making the solder connection, the apparatus parts being mounted on a support in a convenient arrangement for use;

Fig. 2 is a top view of the hot plate device equipped with means for adjustably holding the crystal in required position;

Fig. 5 is a side view, in section, of the hot plate device taken on the line 5—5 in Fig. 2;

Fig. 6 is a front view in section of the hot plate device taken on the line 6—6 of Fig. 2;

Fig. 7 is a view in section of a portion of the hot plate device taken on the line 7—7 in Fig. 2;

Fig. 8 shows a fragmentary portion of the chuck device with a wire held therein and a disc of solder picked up by the end of the wire;

Fig. 9 shows a portion of a crystal with the wire solder-connected thereto; and

Fig. 10 is a top view of the part shown in Fig. 9.

Figure 3:
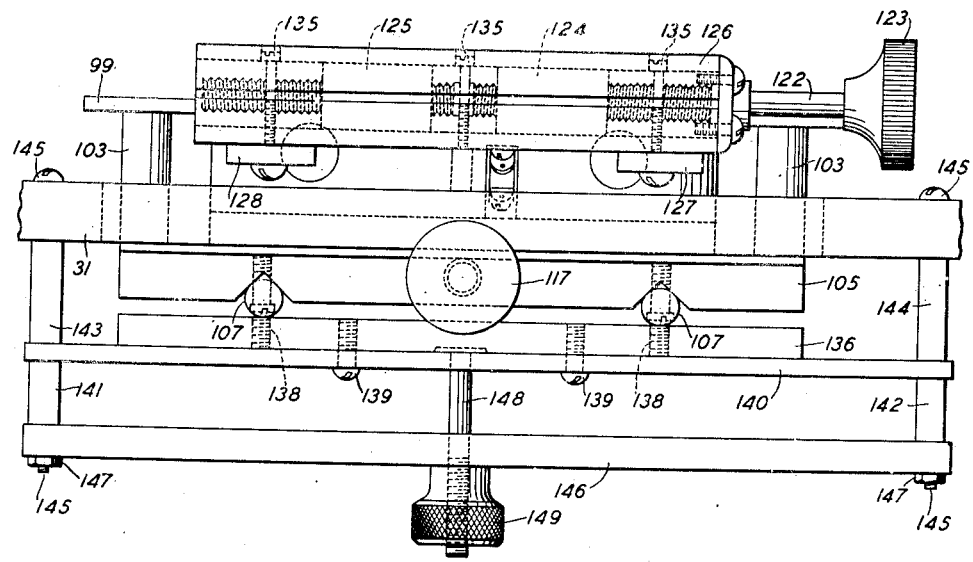
Fig. 3 is a front elevational view of the device shown in Fig. 2 and taken on the line 3—3.

In solder-connecting a wire of relatively fine gauge to a metal surface provided on a piezoelectric crystal, it is important that the wire be connected at the particularly desired point on the crystal, also that the solder connection made is of a predetermined size and form and is sufficiently strong to permit use of the wire as a supporting means for the crystal. It is also important that the wire be not sufficiently affected by the heat applied in making the solder connection as to cause embrittlement or annealing of the wire and that the crystal be not subjected to reactive forces or thermal gradients sufficient to cause fracturing of the crystal.

The apparatus shown in the drawings is constructed and arranged to make solder connections in accordance with the method described in my copending application W. E. Ingerson Serial No. 392,505, filed May 8, 1941 and as shown in Fig. 1 comprises a punch device 26, a chuck device 27, the hot plate device 28, the heated tool 29 and a reel support 30, all of which are mounted on a suitable support 31. The hot plate device 28 is shown as supporting a crystal 32. The wire 35 is held in the chuck device 27 so that the disc of solder on the end of the wire is in contact with the stripe 34 of metal on the crystal and the course of the heated tool 29 is shown by the dot-dash line 33.

In practicing the method above mentioned a disc of solder of predetermined size and form is stamped out by means of the punch device 26. The crystal 32 with the metal stripe 34 thereon is placed on the hot plate device 28 and is adjusted on the hot plate device to a required position. An end portion of the wire 35 is threaded through jaws of the chuck device 27 and so that a required length of the wire 35 projects below the jaws of the chuck device. A suitable flux is applied to the downwardly projecting end portion of the wire and this end portion of the wire is then brought into contact with a predetermined point on the metal stripe 34 and so that some of the flux will be deposited on the metal stripe 34. The chuck device 27 is then rotated to bring the downwardly projecting end of the wire 35 in register with a receptacle provided in the punch device 26 containing the disc of solder. The end of the wire 35 is thrust into the disc of solder so that the disc of solder is impaled on the wire. The chuck device is then rotated back to a position over the crystal 32 and the disc of solder is brought into engagement with the fluxed portion of the metal stripe 34. The heated tool 29 is then rotated to bring the hot point 36, to which solder will not adhere, into contact with the disc of solder. The heat from the tool 29 melts the disc of solder so that the disc of solder will form a solder connection between the end of the wire 35 and the metal stripe 34. Since the end of the wire 35 was previously treated with a suitable flux, the molten material obtained by heating the disc of solder will have a tendency to flow upwardly along the wire 35 and will solidify on the end of the wire 35 in the form of a cone 37 when the heat is removed. The cone-shaped solder connection 37 obtained is shown in Fig. 9. Fig. 8 shows the disc 38 of solder on the end of the wire 35 before the disc is melted to obtain the solder connection 37. The hot plate device 28, the structure of which will be subsequently described, is equipped with heating means and is maintained at a temperature slightly below the melting point of the solder disc 36 so that the crystal 32 will be maintained at an elevated temperature during the making of the solder connection. This prevents fracturing the crystal 32 when the solder connection is being made. Maintaining the crystal at the elevated temperature reduces the reactionary effect upon application of the heated tool 29 to the disc 38 on the crystal 32. After the solder connection is made the wire 35 may be severed at a predetermined point to leave a portion of the wire solder-connected to the crystal as shown in Fig. 9. A suitable supply of wire 35 is contained on the spool 39 which is rotatably mounted on the reel support 30.

*Hot plate device*

The hot plate device 28 is used to support the crystal 32 while an end of the wire 35 is being solder-connected to the stripe 34 on the crystal 32 and is provided with adjustable positioning means to move the crystal to its desired position and hold it in that position while the solder connection is being made.

As shown in Fig. 1 the hot plate device 28 is positioned within a relatively large rectangular opening 97 provided in the support 31 and comprises a round table 98 and a rectangular frame plate 99, the upper surfaces of the table 98 and the plate 99 being in the same plane. The elongated aperture 100 is provided in the table 98 for a purpose to be later explained. As shown in Fig. 2 the table 98 is provided with cartridge type heating elements 101 which may be supplied with electrical current from a suitable source of supply, not shown, to heat the table 98 to a required temperature, the heating elements 101 being located in apertures 102 provided in the table 98 as shown in Fig. 6.

The frame plate 99 as shown in Figs. 1, 3, and 6 is supported on spaced posts 103 and is secured thereto by means of the screws 104. The posts 103 are supported on spaced slide bars 105 and are secured thereto by means of the screws 106. The slide bars 105 rest on spaced tracks 107 which are cylindrical in cross section. The slide bars 105 are transversely grooved on their lower surfaces as shown at 108 to accommodate the tracks 107. The leaf springs 109 secured by means of screws 110 to the under surface of the slide bars 105 are provided to retain the slide bars 105 on the tracks 107, the springs 109 having curved end portions to frictionally engage the under surfaces of the tracks 107. The tracks 107 are longer than the aperture 97 in the support 31 and are secured at their ends by means of screws 111 as shown in Fig. 5, to cross pieces 112. The bars 105 are apertured to accommodate the adjustment rod 113 which is journaled in one of the crossbars 112 and provided with retaining collars 114 and 115. The inner end of the rod 113 is externally threaded as shown at 116 and one at least of the bars 105 is internally threaded to receive the thread on the rod 113. The adjustment rod 113 is equipped with a manually operated knob 117 so that the adjustment rod 113 may be manually rotated.

The table 98 may be made of aluminum or other good heat transmitting material and rests on an insulating plate 118 as shown in Fig. 6 which rests on the slide bars 105. The table 98 and the insulating plate 118 are secured in place by means of screws 119 which extend through apertures in the slide bars 105, through suitable apertures in the insulating plate 118 and into threaded engagement with the table 98. The table 98 and the frame plate 99 may be moved backward and forward within the aperture 97 by suitable rotation of the adjustment rod 113. It will therefore be seen that when the crystal 32 is supported on the table 98, the table 98 and the frame plate 99 may be moved as a whole either backward or forward within the aperture 97 to bring the crystal or a predetermined point thereon into a desired position relative to an end of the chuck device 27 when the chuck device 27 is swung into overlying position relative to the hot plate device 28. The hot plate device 28 is equipped with relatively long positioning finger 120, 121 to further adjust the crystal 32 to a required position and to hold the crystal in the position required. The fingers 120 and 121 are arranged in parallel spaced relation and extend across the upper surface of the table 98 and the frame plate 99 and may be moved toward each other to embrace the crystal 32, or away from each other by operation of a manually rotatable adjustment screw 122 equipped with a turning knob 123. The screw 122 has right and left-hand thread portions engaging suitable threaded sleeves 124 and 125 which are slidably supported in a longitudinally apertured block 126. The block 126 is supported on flat bars 127 and 128 extending from the front edge of the frame plate 99 and which are secured to the under surface of the plate 99 by means of the screws 129. The bars 127 and 128 are secured by means of the screws 130 to the under surface of the block 126. A slide way 131 is provided in the rear wall of the block 126 to accommodate wide portions of the fingers 120 and 121. The slide way 131 is in communication with the longitudinal bore 132 provided in the block 126. When the knob 123 is rotated in one direction the fingers 120 and 121 are moved toward each other by means of the threads on the shaft 122 and the sleeves 124 and 125, the widened ends of the fingers 120 and 121 being secured in suitable slots 133 provided in the sleeves 124 and 125 as shown in Fig. 7. Manual rotation of the knob 123 in the opposite direction will cause the fingers 120 and 121 to be moved away from each other. An elongated slot 134 is formed in the front portion of block 126 and screws 135 are provided in the block to regulate the frictional engagement of the upper and lower walls of the aperture 131 on the portions of the fingers 120 and 121 extending therethrough, the screws 135 being extended transversely across the slot 134 and having screw threaded engagement with the portion of the block 126 lying below the slot 134. When the screws 135 are tightened, the portions of the block 126 lying above and below the slot 134 are drawn toward each other. It will be seen that since the slot 134 extends almost to the bore 132 in the block 126, tightening of the screws 135 will have the effect of slightly widening the aperture 131 to allow the fingers 120 and 121 to more freely slide in the aperture 131. The screws 135 may be used therefore to reduce or increase the frictional engagement of the walls defining the aperture 131 with the fingers 120 and 121 to a required extent. By tightening the screws 135 the fingers 120 and 121 may be held in a required adjusted position.

The tracks 107 are supported on spaced ties 136 and 137 and secured thereto by means of the screws 138. The ties 136 and 137 are secured by means of screws 139 to a flexible plate 140 supported at its ends on pillars 141 and 142 and the plate 140 is held in spaced relation with the support 31 by means of the pillars 143 and 144. The pillars 141, 142, 143 and 144 are longitudinally bored and are held in place by long bolts 145 which also pass through the support 31, the pillars, the flexible plate 140 and a rigid plate 146. It will be seen by looking at Fig. 3 that the rigid plate 146 is suspended from the support 31 by means of the long bolts 145 which are equipped with nuts 147 to hold the parts in assembled condition. A bolt 148 is secured in about the central portion of the flexible plate 140 and extends downwardly through the rigid plate 146 and is equipped with a relatively large knurled nut 149 to provide means for adjusting the table 98 and the frame plate 99 upward and downward relative to the support 31. Turning of the nut 149 in a clockwise direction will cause downward flexing of the flexible plate 140 and consequent slight lowering of the table 98 and the frame plate 99. When the nut 149 is turned in a counter-clockwise direction the flexible plate 140 will resume its normal position and will restore the table 98 and the frame plate 99 to normal position.

Figure 4:
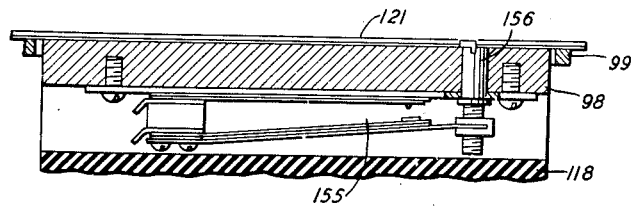
Fig. 4 is a view, partly in section, taken on the line 4—4 in Fig. 2 and shows a thermostat provided in the hot plate device.

The aperture 100 provided in the table 98 as shown in Fig. 2 extends more than half the distance across the table 98 and through the entire thickness of the table. The upper edges of the walls defining the elongated aperture 100 are cut back to provide shoulders 150 to serve as a rest for a positioning block 151 through which a holding screw 152 extends. The lower end of the screw 152 as shown in Fig. 6 is provided with a large flat head 153 which extends in overlapping relation with the aperture 100 and into a slot 154 provided in the insulating plate 118. The upper end of the screw 152 is kerfed to permit turning the screw within the block 151 which may be adjusted along the aperture 100 to provide a backstop for the crystal 32. The aperture 100 also provides a space in which wires already attached to a crystal may extend while a wire is being attached to the other side of the crystal. A thermostat 155 is provided to control the supply of current to the heating elements 101, the thermostat 155 being of the bimetallic element type and located in a suitable slot provided in the table 98. The thermostat 155 as shown in Fig. 4 may be adjusted by means of the screw 156 so that its contacts will open and close at required temperatures.

It will be seen that since the crystal may be held in a required position on the table 98 by means of the block 151 and the fingers 120 and 121 and the hot plate device may be adjusted forward and backward and may be raised and lowered the crystal may be readily brought to a required position relative to the wire held in the chuck device 27. Also, that the pivotally supported heated tool 29 provides a ready and convenient means for applying heat to the disc of solder supported on the wire and engaging the stripe of metal on the crystal.

Heated tool

The heated tool 29 as shown in Fig. 1 somewhat resembles an electric soldering iron. The hot point 36 of the tool, however, is made of aluminum or some other heat transmitting material to which solder will not adhere. The tool is held in a clamp 157 which is pivotally supported in the yoke 158. The yoke 158 is pivotally supported on a post 159 provided with a base 160 which is secured by means of the screws 161 to the support 31. A heating element in the tool may be supplied with current through a conductor 162 which may extend from a suitable source of current supply, not shown.

For an explanation of parts shown in the drawings and not specifically described in the present application reference may be had to my copending application W. E. Ingerson, Serial No. 392,505, filed May 8, 1941.

What is claimed is:

In a soldering apparatus of the type described, a hot plate device comprising a table adapted to support a crystal element, heating means in said table, a frame plate extending around said table and on an even plane with said table, spaced tracks, supporting means for said tracks, spaced bars riding on said tracks and supporting said table and said frame plate, means for adjustably moving said table and said frame plate along said tracks, a block supported along an edge of said frame plate, spaced fingers adjustably supported within said block and extending in parallel spaced relation across said table and said frame plate, screw threaded means supported within said block and arranged to move said fingers toward and away from each other, a flexible plate supporting said supporting means, a rigid plate extending in parallel spaced relation with said flexible plate, end supports for said flexible plate and said rigid plate and manually operated flexing means for said flexible plate, extending from said flexible plate and through said rigid plate and through operation of which said table and said frame plate may be raised and lowered.

WILLIAM E. INGERSON.